Feb. 23, 1971  K. RADACH  3,565,563
APPARATUS FOR HOUSING, HANDLING AND TREATING ANIMALS
Filed Oct. 25, 1968  4 Sheets-Sheet 1
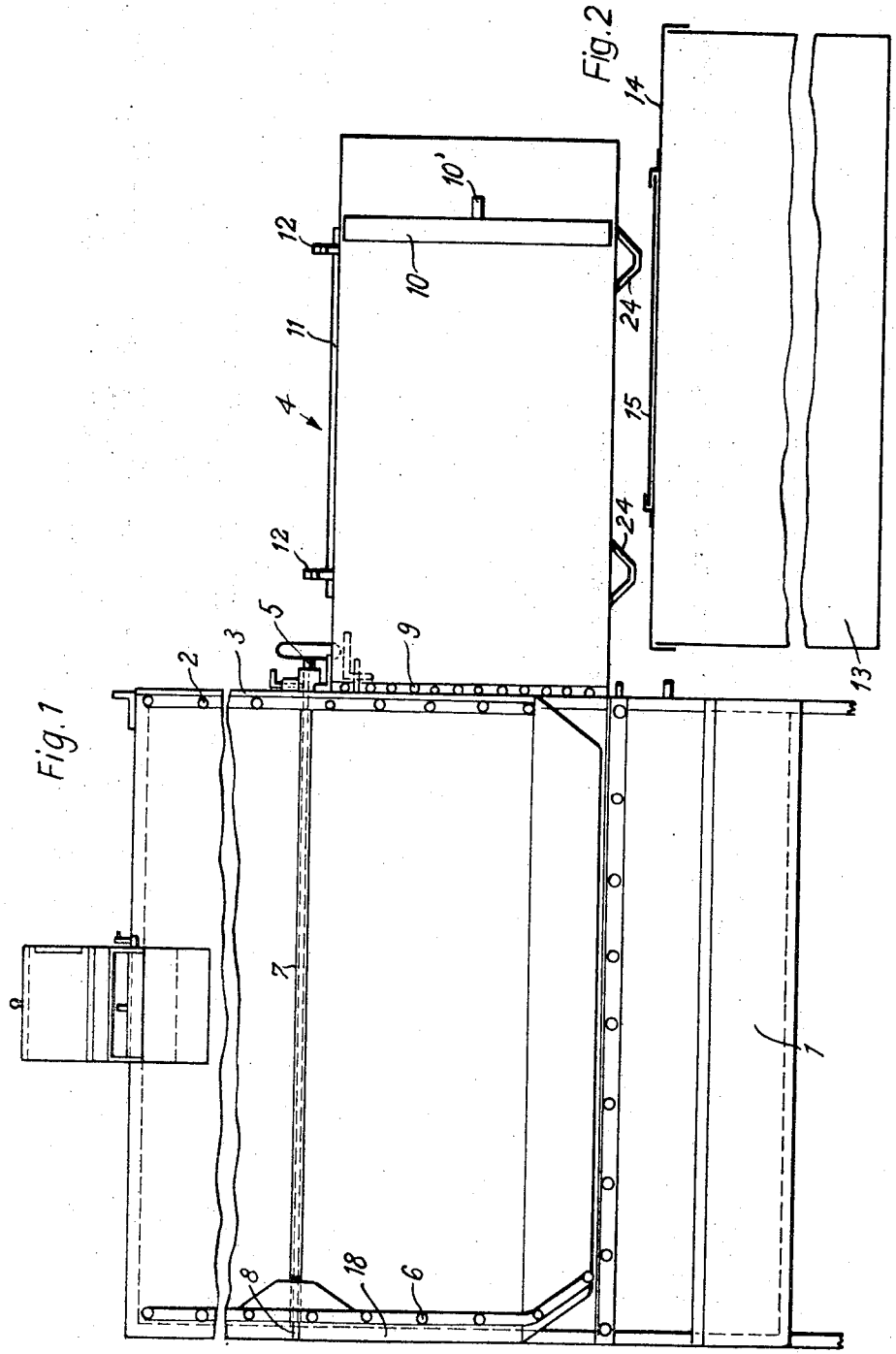
INVENTOR
KURT RADACH
BY
*Craig & Antonelli*
ATTORNEYS

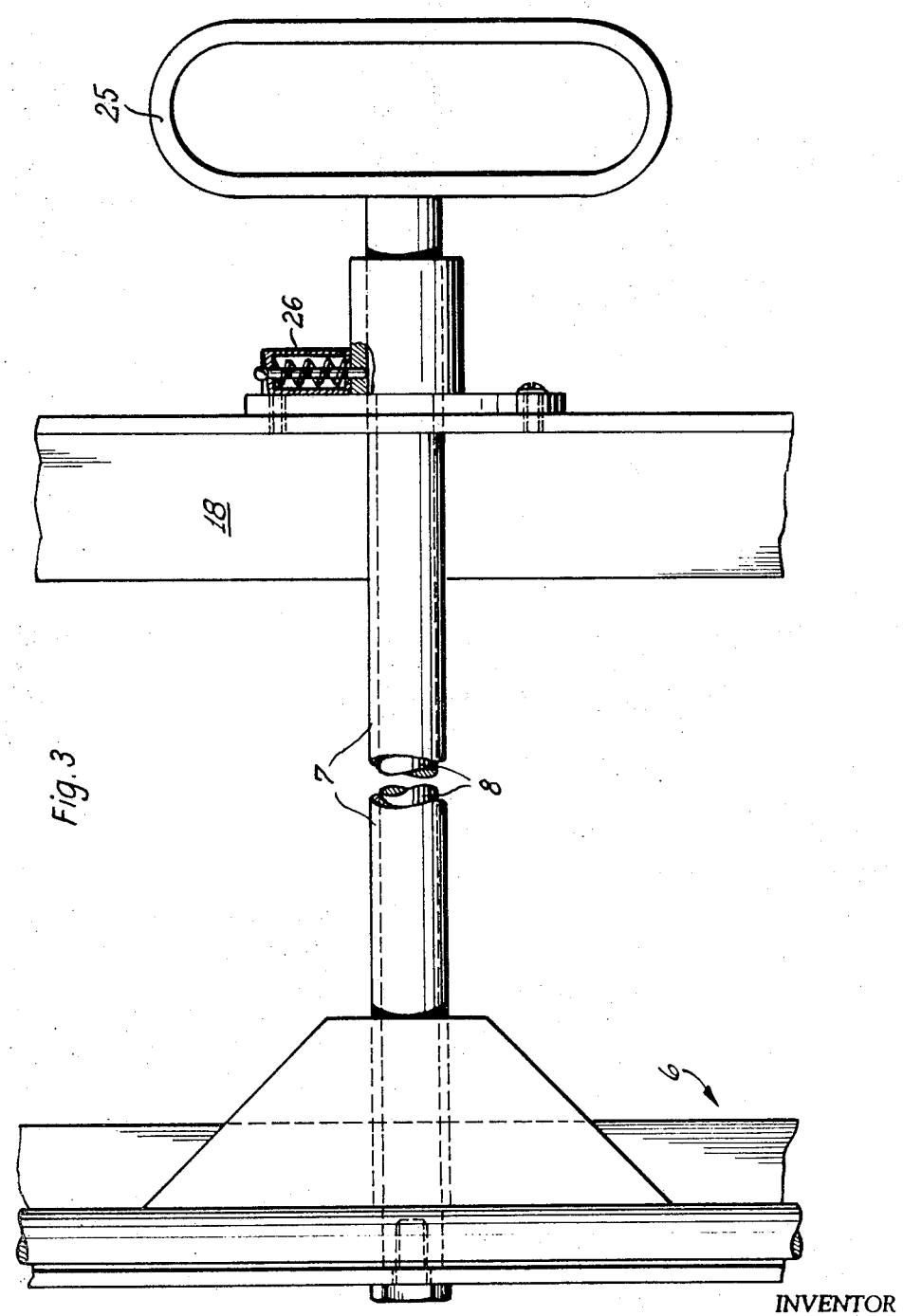

Feb. 23, 1971        K. RADACH        3,565,563
APPARATUS FOR HOUSING, HANDLING AND TREATING ANIMALS
Filed Oct. 25, 1968        4 Sheets-Sheet 3
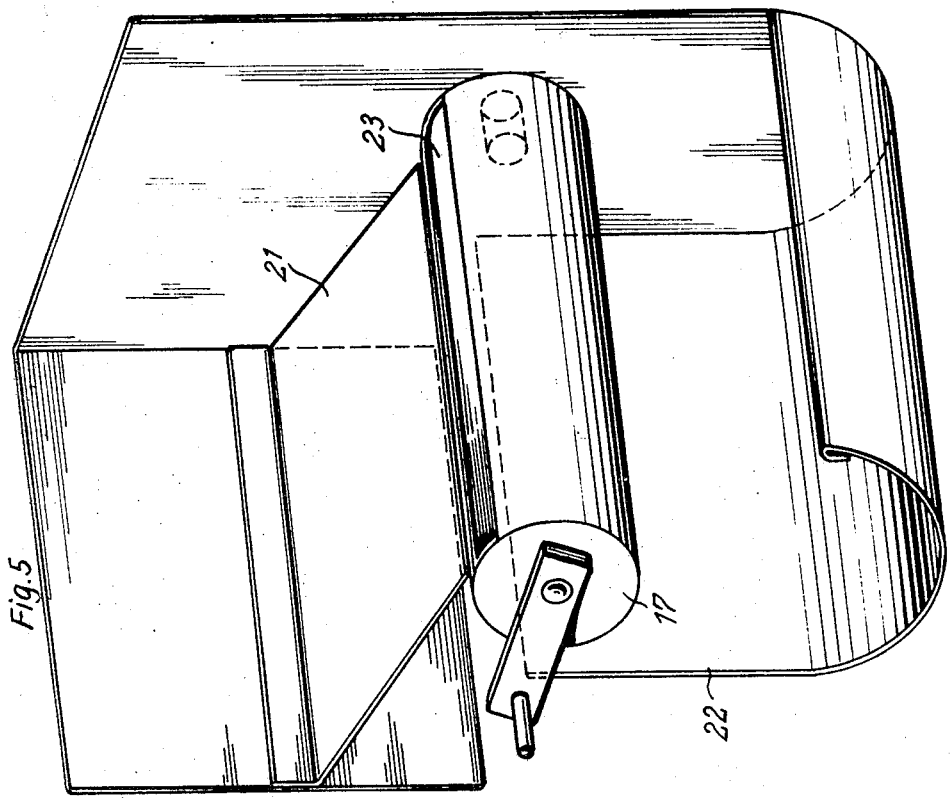
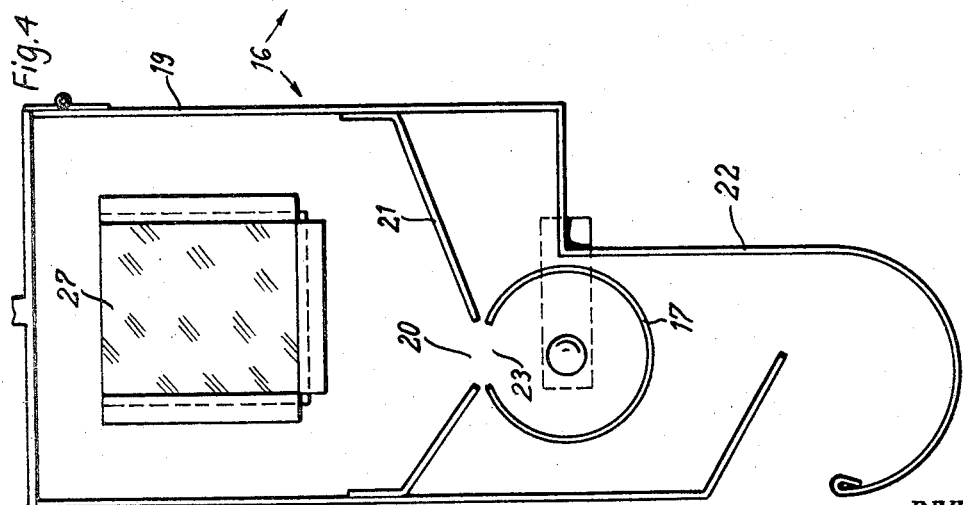
INVENTOR
KURT RADACH
BY
ATTORNEYS United States Patent Office 3,565,563
Patented Feb. 23, 1971

3,565,563
APPARATUS FOR HOUSING, HANDLING AND
TREATING ANIMALS
Kurt Radach, Kuchen, Wurttenberg, Germany, assignor
to Alfred Heinkel & Co., KG, Metallwarenfabrik,
Stuttgart-Zuffenhausen, Germany
Filed Oct. 25, 1968, Ser. No. 770,746
Claims priority, application Austria, May 15, 1968,
A 4,681/68
Int. Cl. A01k *31/00*
U.S. Cl. 119—18                                     7 Claims

ABSTRACT OF THE DISCLOSURE

Apparatus for the housing, handling and treatment of animals, particularly animals kept for experimental purposes, including a storage cage having a front wall portion, a part of which is displaceable to define an opening therein at least large enough for the passage therethrough of the animal, and a rear wall portion which is displaceable in the direction of the front wall portion, a transfer cage adapted to cooperate with the storage cage and having a front wall portion which may be opened to receive or discharge an animal when the front wall portion of the storage cage is similarly opened to permit passage of an animal, said transfer cage having a rear wall portion which is displaceable toward the front wall thereof, a feeding device adapted to be inserted in an opening provided in the top of the storage cage, which feeding device is constructed so as to meter the food deposited therein by means of controls positioned externally of the storage cage.

BACKGROUND OF THE INVENTION

The present invention relates to apparatus for housing handle and treating animals, particularly those kept for purposes of experimentation.

Prior to the present invention, it has been known to provide cages for housing animals kept for purposes of experimentation, wherein the cages are constructed primarily from gratings, screens or spaced-apart bars, with a rear wall member which could be moved forward into the interior space of the cage to urge an animal housed therein to exit, as desired, through an opening provided within the front wall member. Typically, however, such cages incorporating movable rear wall members have been constructed such that the rear wall member could only be moved forward conjointly with the floor or bottom portion of the cage. Some variations of these conventional cage devices incorporate a collapsible floor or bottom portion which can be displaced downwardly upon removal from the cage. These devices, however, present serious problems as to possible infection of the personnel working with the infected animals, in that the infection might be transferred by contact with the animals themselves or with the saliva or the excrements of the animals.

The present invention, by means of a novel construction of the storage cage and cooperating apparatus, eliminates contact between the personnel working with the animals and those substances which could possibly infect the personnel. Further, the construction of the apparatus in accordance with the present invention complies with the legal regulator requirements which have recently been made more stringent.

SUMMARY OF THE INVENTION

Accordingly, it is an object of the present invention to provide apparatus for the housing, handling and treatment of animals, particularly animals kept for purposes of experimentation, which overcomes the dangers and disadvantages of the apparatus employed heretofore for such purposes.

Further, it is an object of the present invention to provide apparatus for the housing, handling and treatment of animals which minimizes the possibility of contact between the personnel in charge of the animals and any of the substances which might transfer the animals' diseases.

Finally, it is an object of the present invention to provide apparatus for housing, handling and treating animals which is structurally reliable yet which is relatively simple and inexpensive to manufacture and maintain.

These objects have been accomplished, in accordance with the present invention, by subdividing the front wall of the storage cage and covering the individual portions thereof with transparent plates and by providing that the individual portions of the front wall can be displaced, at least partially, in the plane of their main extension, either together with the corresponding transparent plates or separately. Further, openings are provided in the storage cage by means of displacement of other parts of the cage, for attachment of a transfer cage and/or a feed distributing device. Thus, it will be seen that the front wall of the storage cage can be formed from three screen or grating portions disposed side-by-side with transparent plates covering each portion, each of these being displaceable in the vertical direction. When the central portion of the grating wall and the corresponding central plate are vertically displaced together, a passage is formed for ingress or egress of an animal.

Additional details of the present invention can be seen from the following description wherein the present invention is explained in greater detail, with reference to the embodimnet illustrated in the drawings, wherein:

FIG. 1 represents a lateral view of the storage cage with a transfer cage attached thereto at the front wall;

FIG. 2 is a lateral view of a narcosis cage which can be utilized in conjunction with the storage cage illustrated in FIG. 1;

FIG. 3 represents an enlarged view of the means for displacing the rear wall of the storage cage;

FIG. 4 is a sectional view through the feed distribution device of the present invention;

FIG. 5 is a perspective view of the feed distribution device of FIG. 4; and

DETAILED DESCRIPTION OF THE DRAWINGS

Figure 6:
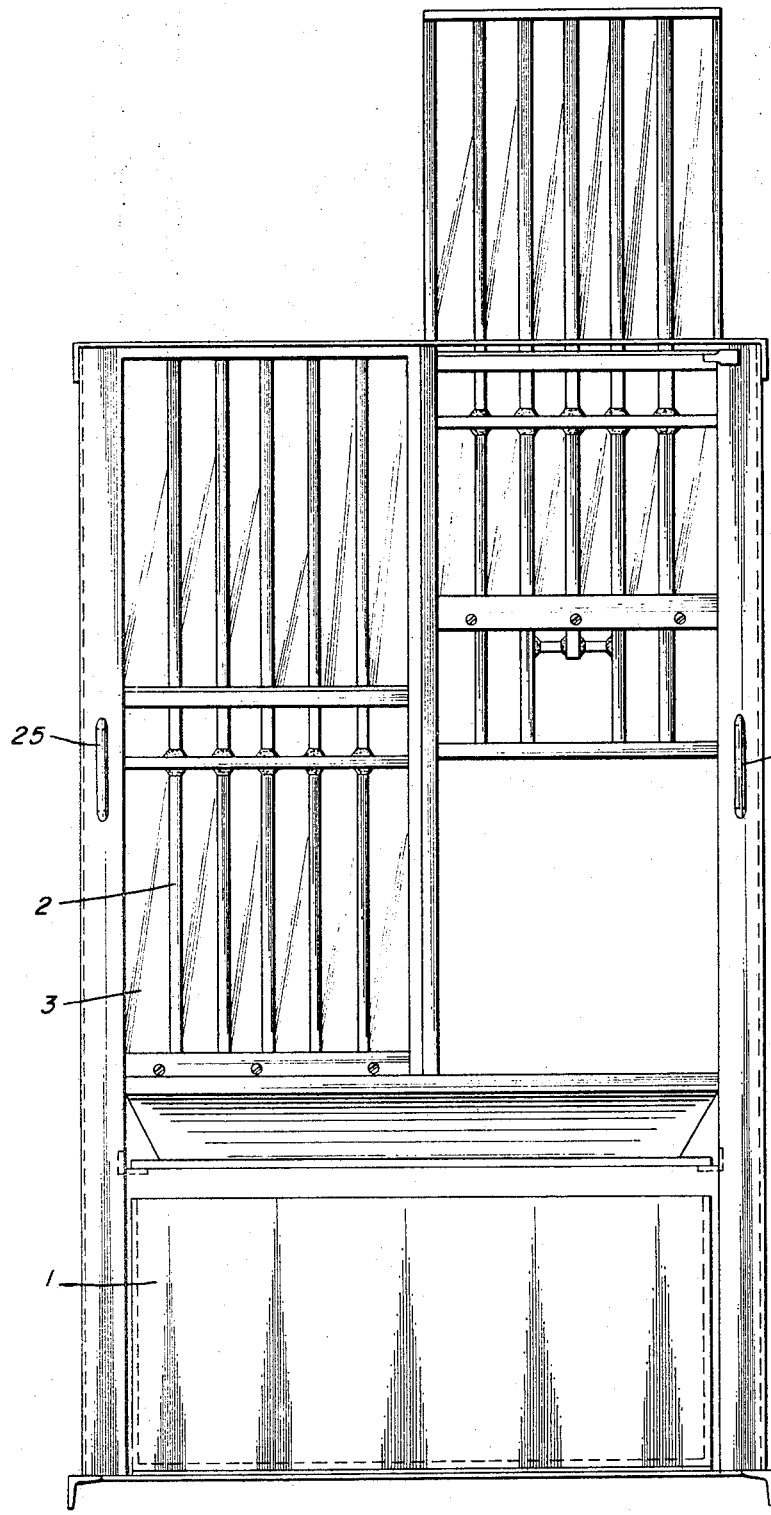
FIG. 6 is a front view of the storage cage without the transfer cage and with only two mesh grating segments on the front face, one of which is shown partially raised.

As can be seen from FIG. 1, the side walls and the roof of the storage cage are formed of sheet metal, for example, stainless steel sheets, whereas the front face of the cage is provided with a wall 2 formed from bars, for example of stainless steel, which wall 2 is divided vertically to form three individual sections. Transparent plates 3 are inserted in front of each of the individual sections of wall 2 in such a manner that they may be displaced vertically. The two outer portions of the wall 2 are fixed, but the central portion thereof can be displaced vertically together with the vertical displacement of the transparent plates. The transfer cage, generally designated by 4, is arranged so that it may be attached to the front wall of the storage cage and suspended therefrom. The transfer cage 4 incorporates a drop grating 9 which may be displaced vertically upward in the same manner as the central portion of front wall 2 and the transparent plates of the storage cage. Further, provisions are made for locking the transparent plates 3 in a vertically-displaced position.

The rear wall of the storage cage is formed by a horizontally-displaceable grating 6 disposed normally immediately in front of stationary frame 18. The movable rear wall grating 6 extends downward to a point in close proximity to the fixed floor of the storage cage, but is not attached thereto. Thus, rear wall grating 6, mounted, on tubular support bars 7, for motion in the direction of the front wall 2, is capable of being displaced by the displacing device generally designated by 5, under the control of two handles 25. With the front grating 2 in a closed position, the rear grating 6 can be moved forward to restrain the test animal against the front grating 2 in order to administer an injection. On the other hand, with the front grating 2 in an open position, the rear grating 6 can be utilized to urge the test animal out of the storage cage into the attached transfer cage, provided that drop grating 9 is also in an open condition.

The displacement of rear wall grating 6 in the horizontal plane by means of tubular support bars 7 is made possible by rods 8 mounted upon the stationary frame 18 at the rear of the storage cage. The tubular support bars 7 are themselves guided in the interior of the cage on rods 8 and penetrate the frame at the front side of the storage cage, being displaceably supported at that point and terminating in a control handle 25. Snap-lock retainer means 26 is secured to the stationary frame 18 and engages the tubular support bars 7 to retain the bars at predetermined positions of the rear wall grating 6. This construction eliminates the necessity for providing lateral slots in the side walls of the cage and also precludes the necessity of attachment devices mounted on the outside of the lateral walls of the storage cage. Thus, the construction in accordance with the present invention allows a plurality of cages to be aligned in a row, either in abutting relationship or with only minimal lateral spacing required. Further, the elimination of the additional openings in the lateral walls of the storage cage greatly reduces the danger of accidental infection of personnel by the test animals.

The transfer cage 4, which is adapted to be attached to the storage cage and suspended therefrom, incorporates a drop grating 9 at its front wall, as discussed above. The drop grating 9 is further provided with attachments for locking the grating either in the open or in the closed condition. Additionally, the transfer cage 4 is provided with a wall 10 on the rear side thereof, the wall 10 being displaceable in the direction of the drop grating 9 in a manner generally similar to that of the rear grating 6 of the storage cage. As shown, however, the motion of the wall 10 is controlled more simply than that of the rear grating 6 by a handle 10' in the manner of a drawer. The forward displacement of the wall 10 with the drop grating 9 in an open condition urges an animal within the transfer cage to leave through the opening in the front of the cage. The topside of the transfer cage 4 is preferably provided with a transparent plate 11 to facilitate observation of an animal within the cage. Two transporting handles 12 are conveniently located on the topside of the transfer cage and supporting feet 24 are disposed on the bottom thereof.

The transfer cage 4, including handles 12 and feet 24, is dimensioned such that the external dimensions thereof are smaller than the internal dimensions of a narcosis container 13, utilized in association with the transfer cage 4. The narcosis container 13 includes a lid 14 having an observation window 15 therein and appropriate attachments for sealing the lid to render the container gas-tight. Thus, the transfer cage 4, with one or more test animals therein, can be placed within the narcosis container 13, which may then be securely sealed to permit the narcosis of the test animals within the transfer cage by the introduction of gas through an appropriate conduit (not shown).

The roof of the storage cage is preferably provided with an opening which may be selectively closed by means of an appropriate flap or lid. When desired, however, this opening can be employed for the insertion into the storage cage of a feed distributing device 16. This device includes a storage tank 19 having tapered bottom sections 21 which serve to guide material from the storage tank 19 to a slot-like opening 20. The feed distributing device is dimensioned such that the storage tank 19 extends above the roof of the storage cage while a feeding and dispensing container, positioned below the slot-like opening 20, extends into the cage. Immediately below the slot-like opening 20, a metering or dosing drum 17 is supported for rotation about a generally horizontal axis. The metering or dosing drum 17 includes a slot 23 which has a width substantially corresponding to that of the slot-like opening 20. The rotation of metering drum 17 provides for a similar rotation of slot 23; therefore, the drum 17 is rotatably supported so that slot 23 therein may be rotated through at least 180°. After being inserted through the opening in the top of the storage cage, the feed distributing device can be locked in position. The metering or dosing drum 17 then facilitates the rationing of feed from the exterior of the storage cage, thus providing further protection of the personnel from accidental infection by the test animals housed within the cage. The construction and arrangement of the feed distributing device according to the present invention is further advantageous in that the positioning of the feed storage tank 19 in a position inaccessible to the test animals within the storage cage and the provision of the dosing or metering device combine to significantly reduce feed waste.

In this connection, storage tank 19 is preferably provided with an observation window 27 which permits a visual monitoring of the quantity of feed remaining in the storage tank.

As illustrated in FIG. 1, a portion of the feed distributing device, when inserted into the storage cage, lies within the path of travel of the upper portion of rear grating 6. Thus, it would be necessary to remove the feed distributing device and tightly close the opening in the upper surface of the storage cage prior to displacing the rear wall grating 6 forward into the interior of the cage.

A trough 1, lined with a removable bag (not shown), is disposed beneath the bottom surface of the storage cage, which surface is in the form of a screen, grate or the like. Thus positioned, the trough serves effectively for the removal of animal excrements. The trough 1 is preferably spaced below the bottom surface of the storage cage by a distance which precludes an animal within the storage cage from reaching the disposable bag. A disposable bag of this type, for example, made of polyvinyl chloride, effectively provides for the collection and removal of the animal excrements without soiling the container and further enhancing the safety of the personnel from accidental infection.

The entire unit hereinabove described can be easily disassembled into individual components to facilitate a thorough cleaning of the animal cages, after which the units may be just as readily re-assembled.

The entire unit assembly of cages described herein, or at least some of the component parts, may suitably be constructed of stainless steel.

While I have shown and described only one embodiment in accordance with the present invention, it is to be understood that the same is not limited thereto, but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. Apparatus for housing, handling and treating animals, particularly animals kept for purposes of experimentation, comprising: storage cage means including a front wall divided into three mesh grating segments disposed in side-by-side relationship, the central one of which is displaceable vertically in the plane of its main extension to define an opening in said front wall large enough to permit passage therethrough of an animal housed within said storage cage means while the other segments are fixed, three transparent plates, one for each respective segment of said divided front wall, said plates being disposed adjacent to said front wall segments and being vertically displaceable in the plane of their main extension, said central segment and the corresponding transparent plate being adapted for displacement together, and a horizontally movable rear wall mesh grating extending in a generally vertical plane downward to a point in close proximity to the floor of the storage cage means, said rear wall mesh grating having a means for being reciprocally displaceable, in the direction toward said front wall and said central segment opening, into the interior of the storage cage means to provide an animal moving means.

2. Apparatus according to claim 1, further comprising a transfer cage means adapted for connection to the front wall of said storage cage means and suspension therefrom, the front wall of said transfer cage means which faces said storage cage means when the transfer cage means is attached to said storage cage means including a grating adapted for vertical displacement, thus defining an opening aligned with the opening in the front wall of the storage cage means, and displaceable transparent plate means adjacent to said grating.

3. Apparatus according to claim 2, wherein the rear wall of said transfer cage means is displaceable in a plane at right angles to the plane of its main extension, into the interior of said transfer cage means.

4. Apparatus according to claim 3, wherein said transfer cage means further includes a roof portion defining an opening therein with a transparent plate covering said opening in said roof portion and supporting feet on the bottom thereof and carrying handles attached to said roof portion thereof, and further comprising narcosis chamber means including a container having internal dimensions sufficiently large to receive and enclose said transfer cage means therein, said narcosis chamber means further including a lid, means for sealing said lid to provide a gas-tight seal and at least one observation window.

5. Apparatus according to claim 4, further comprising means for controlling the displacement of said rear wall grating of said storage cage means, including support rods secured at one end thereof to a stationary frame member at the rear of said storage cage means and tubular support members guided on said support rods which extend through the interior of said storage cage means and are displaceably secured to a stationary frame member at the front of said storage cage means, said rear wall grating being supported on said tubular support members and said support bars, and handle means attached to the free end of said tubular support members.

6. Apparatus according to claim 5, further comprising snap-lock retainer means secured to said stationary frame member and operatively engaging the tubular support members to retain said members at predetermined positions of said rear wall grating.

7. Apparatus according to claim 1, wherein the floor portion of said storage cage means includes a grating, and further comprising a waste collecting trough disposed beneath said storage cage means at a distance which insures that the animal housed within said storage cage means cannot reach the trough, said trough being lined with a disposable bag.

References Cited

UNITED STATES PATENTS

| | | | |
|---|---|---|---|
| 275,969 | 4/1883 | Woodside | 217—36 |
| 2,346,001 | 4/1944 | Bate | 119—17 |
| 2,655,129 | 10/1953 | Miller | 119—17 |
| 2,789,531 | 4/1957 | Diefendorf | 119—17 |
| 2,881,733 | 4/1959 | Young, Jr., et al. | 119—15 |
| 3,063,413 | 11/1962 | Fuller et al. | 119—18 |
| 3,160,140 | 12/1964 | Porter | 119—18 |

FOREIGN PATENTS

| | | | |
|---|---|---|---|
| 259,211 | 4/1913 | Germany | 119—56 |

ALDRICH F. MEDBERY, Primary Examiner